United States Patent
Brown

(10) Patent No.: US 6,661,791 B1
(45) Date of Patent: Dec. 9, 2003

(54) METHOD AND APPARATUS FOR GENERATING FORWARD OVERRIDES IN A PACKET SWITCH

(75) Inventor: David A. Brown, Carp (CA)

(73) Assignee: MOSAID Technologies, Inc., Kanata (CA)

( * ) Notice: Subject to any disclaimer, the term of this patent is extended or adjusted under 35 U.S.C. 154(b) by 0 days.

(21) Appl. No.: 09/473,074

(22) Filed: Dec. 28, 1999

(51) Int. Cl.[7] .............................................. H04L 12/28
(52) U.S. Cl. ...................................... 370/392; 370/401
(58) Field of Search ................................ 370/389, 392, 370/401, 402, 403, 465

(56) References Cited

U.S. PATENT DOCUMENTS

| | | | | |
|---|---|---|---|---|
| 5,608,871 A | * | 3/1997 | Murono ........................ | 370/402 |
| 5,748,905 A | * | 5/1998 | Hauser et al. ............... | 709/249 |
| 5,872,783 A | * | 2/1999 | Chin ........................... | 370/401 |
| 5,920,566 A | * | 7/1999 | Hendel et al. ............... | 370/401 |
| 6,081,522 A | * | 6/2000 | Hendel et al. ............... | 370/412 |
| 6,374,326 B1 | * | 4/2002 | Kansal et al. ................ | 370/392 |
| 6,480,468 B1 | * | 11/2002 | Kishigami et al. .......... | 370/400 |

FOREIGN PATENT DOCUMENTS

| | | |
|---|---|---|
| EP | 0508886 A1 | 10/1992 |
| WO | WO 94/22253 | 9/1994 |

* cited by examiner

*Primary Examiner*—Chau Nguyen
*Assistant Examiner*—Keith M. George
(74) *Attorney, Agent, or Firm*—Hamilton, Brook, Smith & Reynolds, P.C.

(57) ABSTRACT

A memory is successively searched using the contents of a header included in a data packet in order to select a forwarding entry for the data packet. The searches use a header field for a different protocol layer. A next field stored in a forwarding entry is used to determine if another search is required. The data packet is forwarded according to the forwarding override stored in the selected forwarding entry selected from the final successive search. The received data packet is forwarded to a host processor, through the switch, to both the host processor and through the switch, or the received data packet is not forwarded, dependent on the selected forward override.

31 Claims, 9 Drawing Sheets

FIG. 4D

| N 402d | HTL 404d | $Q_v$ 420d | L3Q 422 | FO 408d | | MSBs = "001" 416 | IP-VERSION (4) 418 |

FIG. 4E

| HTL 404e | $Q_v$ 420e | L4Q 424 | FO 408e | | MSBs = "01" 430 | L4 PORT NUMBER (16) 432 |

PRIOR ART
FIG. 5A

| PHYSICAL LAYER (L1) HEADER 502 | DATA LINK LAYER (L2) HEADER 504 | NETWORK LAYER (L3) 506 | TRANSPORT LAYER (L4) HEADER 508 | DATA 510 | CHECKSUM 512 |

| DESTINATION ADDRESS 514 | SOURCE ADDRESS 516 | OPTIONAL VLAN ID 518 | LENGTH/TYPE 520 |

| IP VERSION 522 | IP LENGTH 524 | TYPE OF SERVICE 526 | TOTAL LENGTH 528 |
|---|---|---|---|
| IDENTIFICATION 530 | | 532 FLAGS | 534 FRAGMENT OFFSET |
| TIME TO LIVE 536 | PROTOCOL TYPE 540 | HEADER CHECKSUM 542 | |
| SRC IP ADDRESS 544 | | | |
| DEST IP ADDRESS 546 | | | |
| OPTIONS 548 | | | PAD 550 |

506

METHOD AND APPARATUS FOR GENERATING FORWARD OVERRIDES IN A PACKET SWITCH

BACKGROUND OF THE INVENTION

In a computer network, a networking switch receives a data packet at an ingress port connected to the switch and forwards the data packet to an egress port connected to the switch. The switch determines the egress port to which the data packet is forwarded dependent on a destination address included in a header in the data packet received at the ingress port.

Typically, the switch includes a forwarding table typically implemented in forwarding logic in the ingress engine. The forwarding table is searched for one or more egress ports to which the data packet is to be forwarded dependent on the destination address included in the data packet. However, if the data packet is received for an unknown destination address the switch will not have a matching entry in the forwarding table. Thus, such data packets received at an ingress port are sent to a host processor in the switch; for example, data packets with no matching entry in the forwarding table are forwarded so that the host can update the forwarding table.

One known technique for determining which data packets to forward to the host processor is to make a forwarding decision based on destination address only; for example, to forward all broadcast data packets. If all broadcast data packets are forwarded to the host processor, the host processor may process data packets which may not include information that the host requires. Also, there may be non-broadcast data packets that the host processor requires that are not forwarded to the host. Thus, the forwarding of all broadcast data packets unnecessarily consumes host processor bandwidth and does not provide all the data packets that the host may require.

Another known technique for forwarding data packets to the host processor is to select the data packets to forward based on the data type included in the header of the data packet, such as the type stored in the data link header. The packet types to forward to the host are stored in a host forward list. A data packet is forwarded to the host if the packet type included in the header of the data packet is a member of the host forward list. The host forward list is hardcoded in the switch. In the open systems interconnection, ("OSI") model, the L2 packet type is included in the data link layer header.

For example, the L2 packet type may be Address Resolution Type ("ARP") Bridge Protocol Data Unit, or Internet Protocol ("IP"). This technique reduces the number of data packets forwarded to the host processor by limiting the data packets forwarded to those of a particular type. For example, using the L2 data type stored in the data link header Bridge Protocol Data Unit data packets may be forwarded only to the host processor, ARP data packets may be forwarded to both the host processor and to the egress port and IP data packets may be forwarded to both the host and the egress port.

The disadvantage is that if a networking protocol with a new L2 data type is to be forwarded to the host, a new data packet type must be added to the host forwarding list, requiring a hardware update. This technique also may unnecessarily consume host processor bandwidth because not all data packets of a particular L2 data type, such as IP data packets, may be required for processing by the host.

SUMMARY OF THE INVENTION

A memory in a network switch includes at least one forwarding entry having a forward override. Forward override logic in the switch successively searches the memory for forwarding entries matching portions of a received data packet. The forward override logic extracts the forward override from the matching entries. The matching portions of the data packet may be header fields and identify protocols at multiple layers.

The forwarding entry also includes a next field. The forward override logic determines whether to perform another search of the memory dependent on the state of the next field. The memory may be a content addressable memory.

After the search is complete, the forward override logic extracts a forward override for the received data packet from the forwarding entry. Forward select logic in the switch forwards the received data packet dependent on the extracted forward override.

The forwarding entry may include a priority field dependent on the contents of the received data packet and a traffic label field. The traffic label field and the priority field may be forwarded to a host for processing by the host.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the. same parts throughout the different views. The drawings are not necessarily to scale, emphasis instead being placed upon illustrating the principles of the invention.

FIG. 4D illustrates an IP-Version entry in the protocol CAM shown in FIG. 2;

FIG. 4E illustrates a layer 4 entry in the protocol CAM shown in FIG. 2;

FIG. 5A illustrates a prior art data packet which may be received at an ingress port connected to the switch;

FIG. 5B illustrates a prior art Ethernet (data link layer (L2)) header which may be included in the data packet shown in FIG. 5A;

FIG. 5C illustrates a prior art Internet Protocol (network layer (L3)) header which may be included in the data packet shown in FIG. 5A;

DETAILED DESCRIPTION OF THE INVENTION

Figure 1:
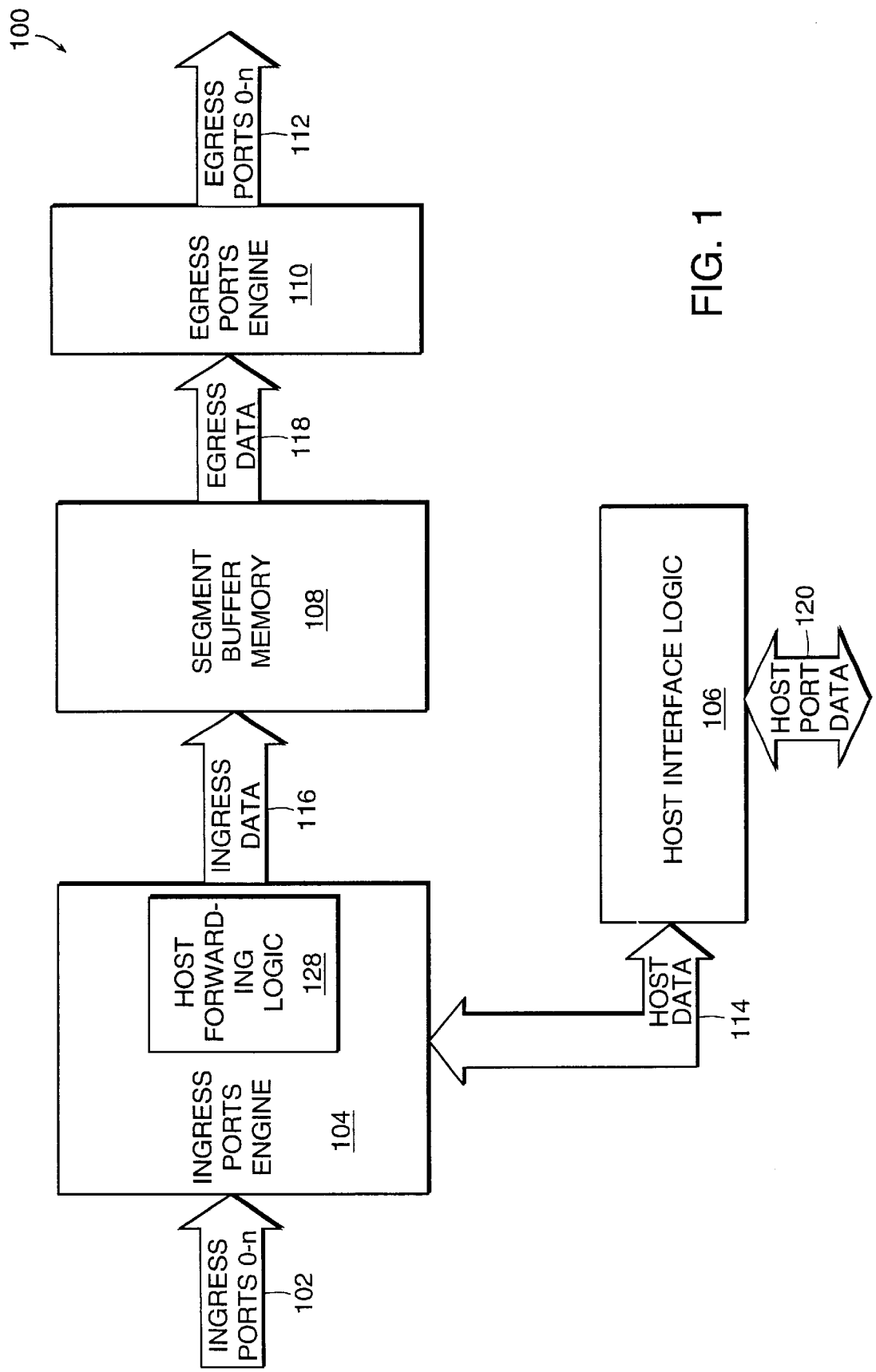
FIG. 1 illustrates a network switch including host forwarding logic for forwarding a data packet received at an ingress port connected to the switch according to the principles of the present invention.

FIG. 1 illustrates a network switch 100 including host forwarding logic 128 for forwarding a data packet received at an ingress port 102 connected to the switch 100. A data packet received at any one of the ingress ports 0-n 102 is processed in the ingress ports engine 104. Host forwarding logic 128 in the ingress ports engine 104 determines from a networking protocol encoded in the header of received data packet where to forward the received data packet. The received data packet may be forwarded on ingress data path 116 to segment buffer memory 108 and/or on host data path 114 to the host interface logic 106.

The host forwarding logic 128 may forward the data packet to both segment buffer memory 108 and the host interface 106 or to either segment buffer memory 108 or the host interface 106, or the host forwarding logic 128 may not forward the data packet; that is, it may drop the data packet. By assigning a forwarding decision for a data packet dependent on a networking protocol encoded in the header of a data packet, only the data packets required by the host are forwarded to the host. Also, if a new networking protocol is introduced, a new forwarding decision can be added to the host forwarding logic 128 by the host processor through the host interface logic 106 and host data path 114.

A data packet forwarded on ingress data path 116 is stored in segment buffer memory 108 and forwarded to the egress ports engine 110 on egress data path 118. The egress ports engine 110 forwards the data packet to one or more egress ports 112 dependent on the contents of the header included in the data packet. The storage of data packets in segment buffer memory 108 is described in co-pending U.S. patent application Ser. No. 09/386,589, filed on Aug. 31, 1999 entitled "Method and apparatus for an Interleaved Non-Blocking Packet Buffer," by David A. Brown, the entire teachings of which are incorporated herein by reference.

A data packet forwarded on host data path 114 to the host interface logic 106 is forwarded by the host interface logic 106 to a host or microprocessor (not shown) on host port data path 120. The host port interface logic 106 is a Peripheral Control Interface ("PCI") host port interface. The host port interface logic 106 is not limited to PCI; it may be other host interface logic known to one skilled in the art. The host interface logic 106 converts host data path 114 into host port data path 120 dependent on the host interface protocol implemented in the host interface logic 106.

Figure 2:
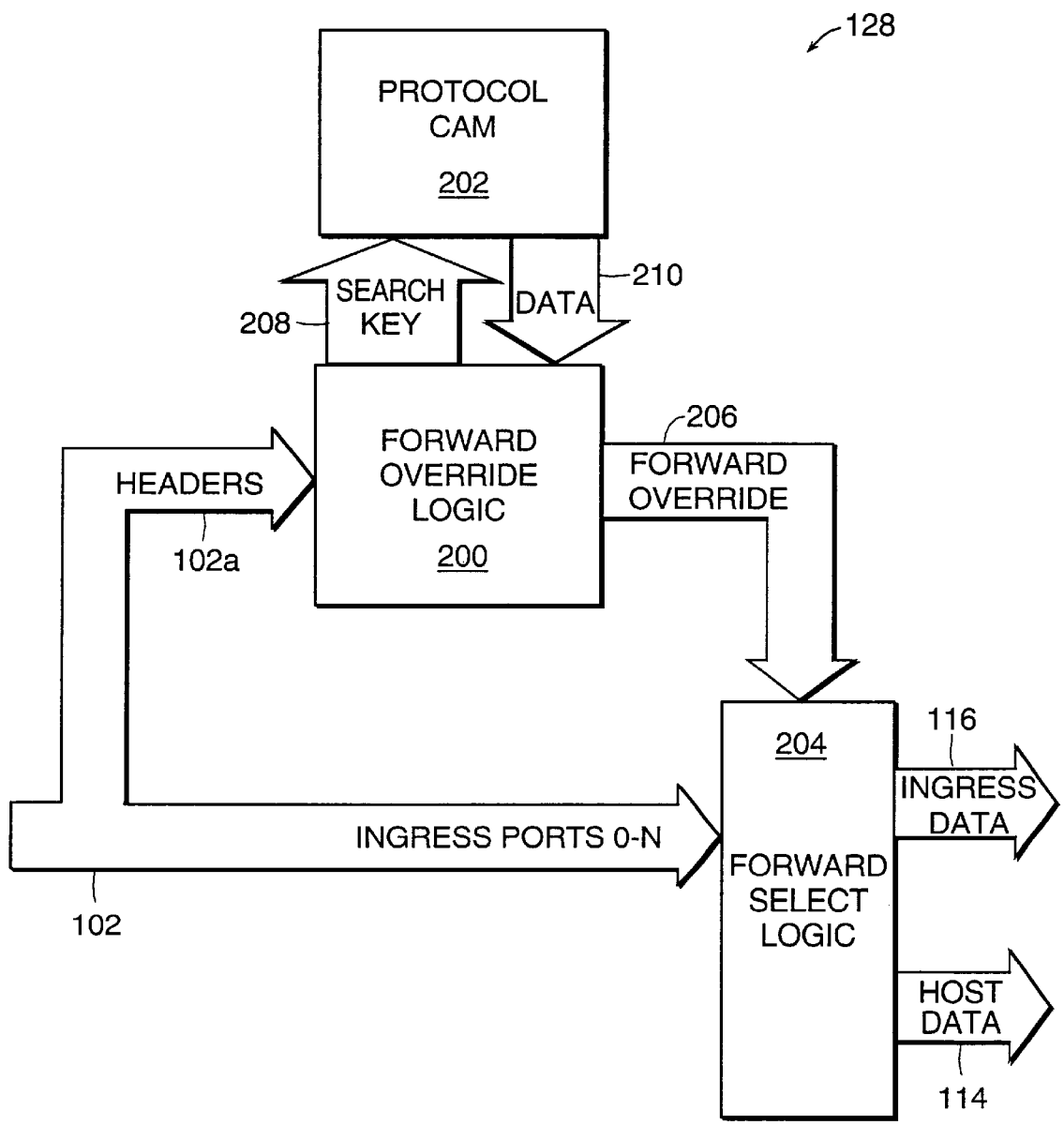
FIG. 2 illustrates the host forwarding logic shown in FIG. 1.

FIG. 2 illustrates the host forwarding logic 128 shown in FIG. 1. The host forwarding logic 128 includes a protocol Content Addressable Memory ("CAM"), forward override logic 200 and forward select logic 204. As a data packet is received at an ingress port 102 (FIG. 1) in the ingress ports engine 104, (FIG. 1) the data packet's header 102a is forwarded to the forward override logic 200 in the host forwarding logic 128.

The forward override logic 200 successively searches the protocol CAM 202 for a forward override 206 stored in a forwarding entry 300 (FIG. 3), dependent on the contents of the received data packet's header 102a. The forwarding entry 300 (FIG. 3) is described in conjunction with FIG. 3. Multiple searches of the protocol CAM 200 may be performed using the contents of different fields in the data packet's header 102a. The data packet's header 102a includes at least one layer header. The layer header includes at least one field. The search for a forwarding entry 300 (FIG. 3) begins at the lowest layer header and subsequent searches search the next higher layer header. For example, a first search for a forwarding entry may be performed using the contents of the type field in the data link layer (L2) header. A second search for a forwarding entry 300 may be performed using the contents of the type field in the network link layer header (L3) dependent on the result of the L2 header search. A third search for a forwarding entry 300 may be performed using the contents of the source address field in the transport layer header (L4) dependent on the result of the L3 search. Whether the search continues to another layer is determined by the value of a next field in each forwarding entry.

At the start of each search, the forward override logic 200 generates a search key 208 by selecting from the contents of the one of the data packet's layer headers and forwards the search key 208 to a protocol Content Addressable Memory ("CAM") 202. If there is a forwarding entry 300 (FIG. 3) matching the search key 208 in the protocol CAM 202, the associated data 210 stored in the forwarding entry 300 (FIG. 3) is forwarded to the forward override logic 200 where a current copy of the forwarding entry is stored. The associated data 210 includes a forward override 206 which is implemented in this embodiment as a 2-bit binary code as shown in Table 1. The forward override 206 indicates where the data packet is to be forwarded. After the last search has been performed, the forward override 206 in the forwarding entry 300 (FIG. 3) selected in the last search is forwarded to the forward select logic 204. The data packet is forwarded on ingress data path 116 and/or host data path 114 dependent on the state of forward override 206 as shown in Table 1.

TABLE 1

| Forward Override | Forwarding Decision |
| --- | --- |
| 00 | Ingress Data only |
| 01 | Ingress Data and Host Data |
| 10 | Host Data only |
| 11 | Do not forward (Drop) |

The protocol CAM 202 is a small table which may be implemented in registers using logic gates, with the host processor having read and write access to the registers. The forward select logic 204 forwards the data packet received at an ingress port 102 to ingress data 116 and/or host data 114 dependent on the state of the forward override 206 forwarded from the forward override logic 200. The forward select logic 204 includes a host buffer (not shown) and an ingress buffer (not shown). The input to the host buffer and the ingress buffer is the received buffer. The output of the host buffer is host data 114. The output of the ingress buffer is ingress data 116. The forward override 206 is encoded in buffer enable logic (not shown) to provide a host buffer enable signal and an ingress buffer enable signal. Thus, the forward override 206 determines whether the received data packet is forwarded through the host buffer to host data 114 and/or through the ingress buffer to ingress data 116.

Figure 3:
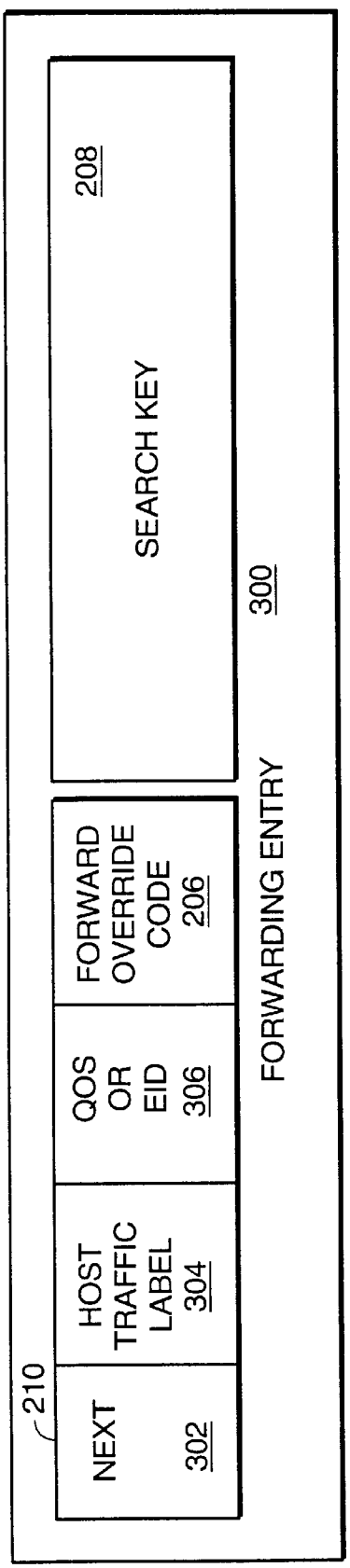
FIG. 3 illustrates the format of an entry in the protocol Content Addressable Memory ("CAM") shown in FIG. 2.

FIG. 3 illustrates a forwarding entry 300 in the protocol CAM 202 (FIG. 2). The forwarding entry 300 includes a search key 208 and associated data 210. The associated data 210 includes a next field 302, an optional host traffic label 304, an optional Quality of Service ("QoS") or Etype IDentifier ("EID") field 306 and a forward override code 206. A copy of the forwarding entry 300 is stored in the forward override logic 200 (FIG. 2) and the forward override code 206 stored in the copy of the forwarding entry 300 is overriden with the forward override code 206 stored in another forwarding entry selected in a subsequent search of the protocol CAM 202 (FIG. 2).

The QoS field 306 provides a priority for the received data packet. The Host traffic label 304 is a tag which provides information on how the received data packet is classified. The host traffic label 306 and the QoS or EID field 306 can be forwarded to the host processor through the host interface logic 106 for processing by the host. The contents of the search key 208 and the associated data 210 included in the forwarding entry 300 are dependent on the contents of the header being processed by the forward override logic 200 (FIG. 2). A new search key 208 is generated for each search by selecting the contents of a different layer header. Forwarding entries 300 are described in conjunction with FIGS. 4A–4E.

The forward override logic 200 (FIG. 2) determines from the state of the next field 302 whether to perform another search for a forwarding entry 300 using the contents of the next higher layer header included in the data packet. The forward override code 206 from the current search overrides the forward override code 206 from the previous search stored in the copy of the forwarding entry (not shown) in the forward override logic 200 (FIG. 2). Thus, the forward override code 206 selected in the last search is the forwarding decision for the data packet.

For example, if the type stored in the L2 header is ARP, no further search is required because all ARP data packets are forwarded on ingress data path 116 and on host data path 114. Thus, the next field 302 in the forwarding entry 300 is set to '0'. However, if the type stored in the L2 header is IP, a further search in the L3 layer header is required to determine the type of IP data packet. If the IP type stored in the L3 layer header's type field is Internet Group Management Protocol ("IGMP"), the next field 302 is set to '0' indicating that no further searches are required, and the data packet is forwarded on ingress data path 116 (FIG. 1) and on host data path 114 (FIG. 1).

The default forwarding decision for IP type data packets may be set to forward on ingress data path 116 (FIG. 1). The forwarding decision is overridden if a subsequent search using the contents of a higher level layer header selects a forward override code 206 (FIG. 2) to forward the data packet on host data path 114 (FIG. 1). By storing the forwarding entries 300 in a CAM, the searches are performed quickly and the forwarding decision is also determined quickly so that the data packet may be forwarded at wire-speed through the switch 100 (FIG. 1).

Figure 4A:
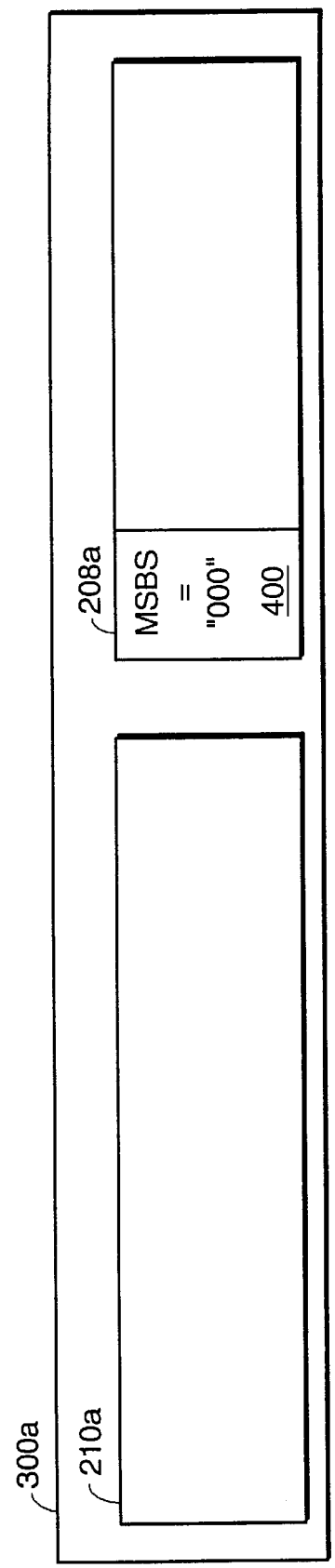
FIG. 4A illustrates an empty entry in the protocol CAM shown in FIG. 2.

FIG. 4A illustrates an empty or invalid entry 300a. The three Most Significant Bits ("MSBs") 400 of the empty search key 208a are set to "000" and invalid associated data 210a is stored.

Figure 4B:
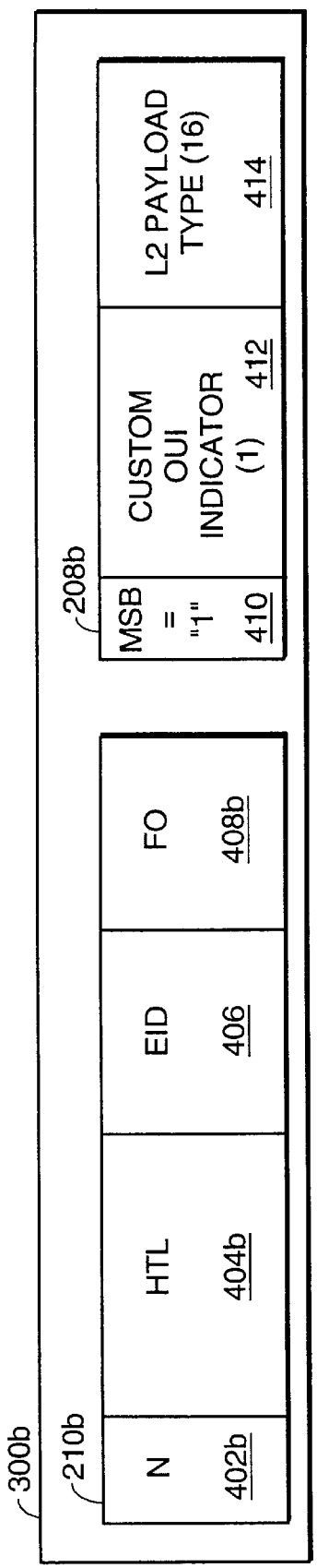
FIG. 4B illustrates a layer 2 type entry in the protocol CAM shown in FIG. 2.

FIG. 4B illustrates an Etype IDentifier ("EID") entry 300b. The MSB 410 of the EID search key 208b is set to "1". The EID search key 208b includes an L2 payload type 414 and a Custom OUI Indicator 412. The EID associated data 210b includes a next field 402b, a Host Traffic Label ("HTL") 404b, an EID 406 and a Forward Override ("FO") 408b.

Figure 4C:
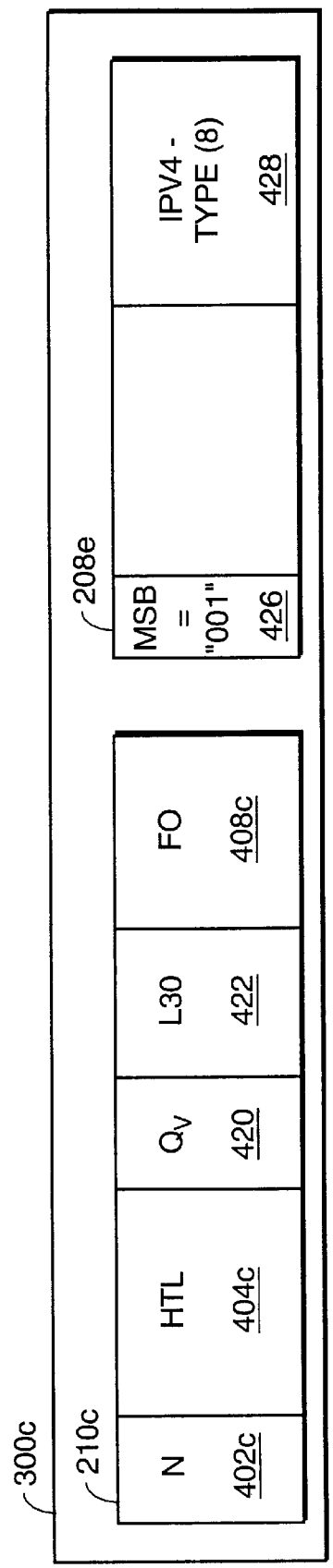
FIG. 4C illustrates an IPv4-type entry in the protocol CAM shown in FIG. 2.

FIG. 4C illustrates an IPv4-Type Entry 300c. The three MSBs 426 of the IP type search key 208c are set to "001". The IP type search key 208c includes an IPv4-Type 428. The IP type associated data 210c includes a next field 402c, a HTL 404c, an LN QoS valid bit 420, a Layer 3 QoS 422 and a FO 408c.

FIG. 4D illustrates an IP-version entry 300d. The three MSBs 416 of the IP version search key 208d are set to "001". The IP version search key 208d includes an IP-Version 418. The IP version associated data 210d includes a next field 402d, a HTL 404d, an LN QoS valid bit 420, a layer 3 QoS 422 and a FO 408d.

FIG. 4E illustrates a L4 port entry 300e. The two MSBs 430 of the L4 search key 208e are set to "01". The L4 port search key 208e includes an L4 port number 432. The L4 port associated data 210e includes a HTL 404e, LN QoS valid field 420, an L4 QoS 424 and a FO 408e.

Figure 5D:
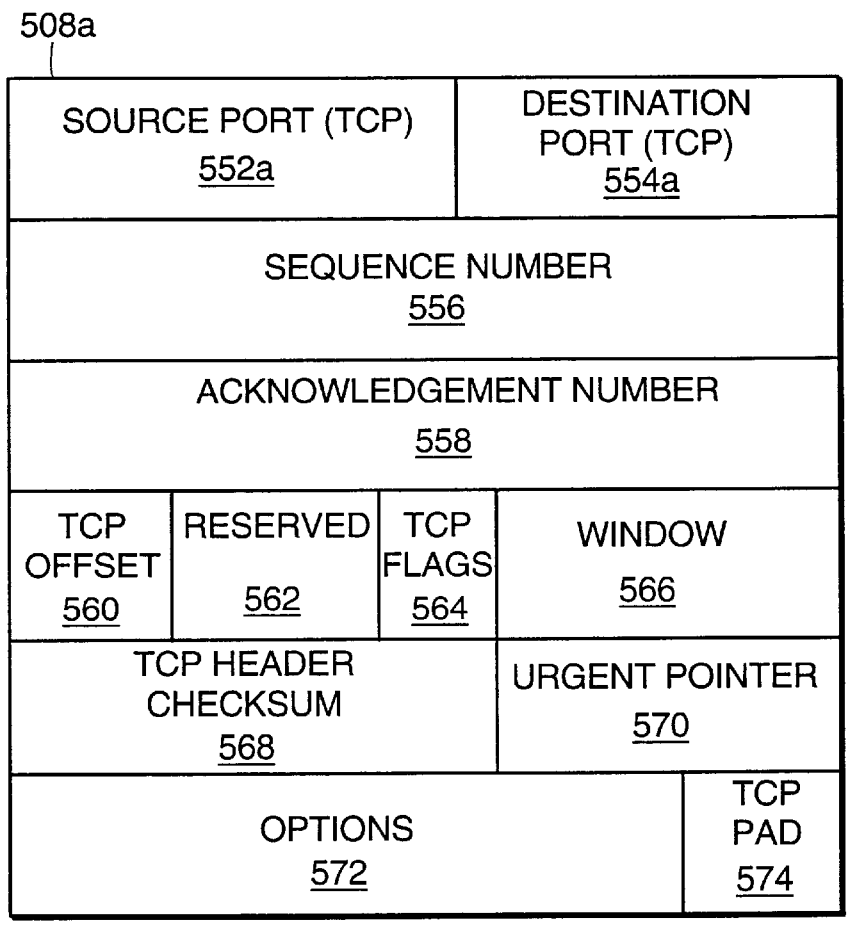
FIG. 5D illustrates a prior art Transmission Control Protocol ("TCP") (transport layer (L4)) header which may be included in the data packet shown in FIG. 5A.

FIG. 5A illustrates a prior art data packet which may be received at an ingress port 102 (FIG. 1) connected to the switch 100 (FIG. 1). FIGS. 5B–5E illustrate the contents of prior art data packet headers which may be included in the prior art data packet shown in FIG. 5A.

FIG. 5C illustrates the format of an IP network layer (L3) header 506. The IP network layer (L3) header 506 includes a source IP address 544, a destination IP address 546, an EP Version field 522, an EP length field 524, Type of Service ("TOS") 526, Total Length 528, identification 530, Flags 532, Fragment Offset 534, Time to Live ("TTL") 536, Protocol Type 540, Header Checksum 542, Options 548 and Pad 550.

FIG. 5B illustrates the format of an Ethernet data link (L2) header 504. The Ethernet data link (L2) header 504 includes a destination address 514, a source address 516, an optional Virtual Local Area Network Identification ("VLAN ID") field 518 and a length/type field 520.

FIG. 5C illustrates the format of an IP network layer (L3) header 506. The IP network layer (L3) header 506 includes a source IP address 544, a destination IP address 546, an IP Version field 522, an IP length field 524, Type of Service ("TOS") 526, Total Length 528, identification 530, Flags 532, Fragment Offset 534, Time to Live ("TTL") 536, Protocol Type 540, Header Checksum 542, Options 542 and Pad 550.

FIG. 5D illustrates the format of a TCP transport layer (L4) header 508a. The TCP transport layer (L4) header 508a includes the following fields: a TCP source port 552a, a TCP destination port 554a, a sequence number 556, an acknowledgment number 558, TCP offset 560, a reserved field 562, TCP flags 564, Window 566, TCP header Checksum 568, Urgent Pointer 570, Options 572 and TCP pad 574.

Figure 5E:
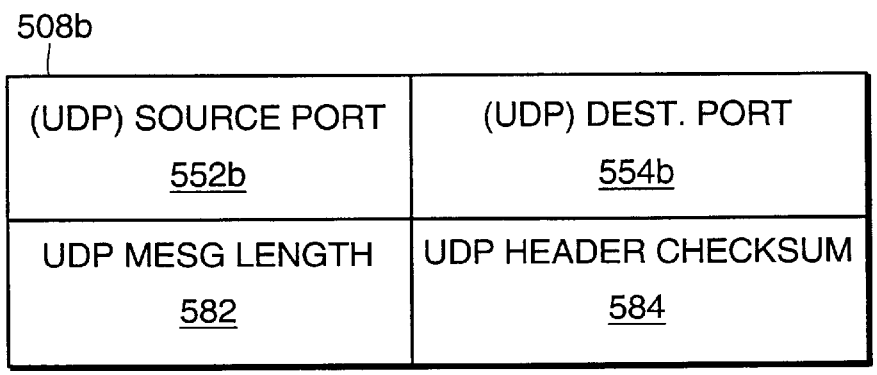
FIG. 5E illustrates a prior art User Datagram Protocol ("UDP") (transport layer (L4)) header which may be included in the data packet shown in FIG. 5A.

FIG. 5E illustrates the format of a UDP transport layer (L4) header 508b. The UDP Transport Layer (L4) header 508b includes the following fields: an UDP Source Port 552b, a UDP Destination Port 554b, a UDP Message Length 582, and a UDP Header Checksum 584.

Figure 6:
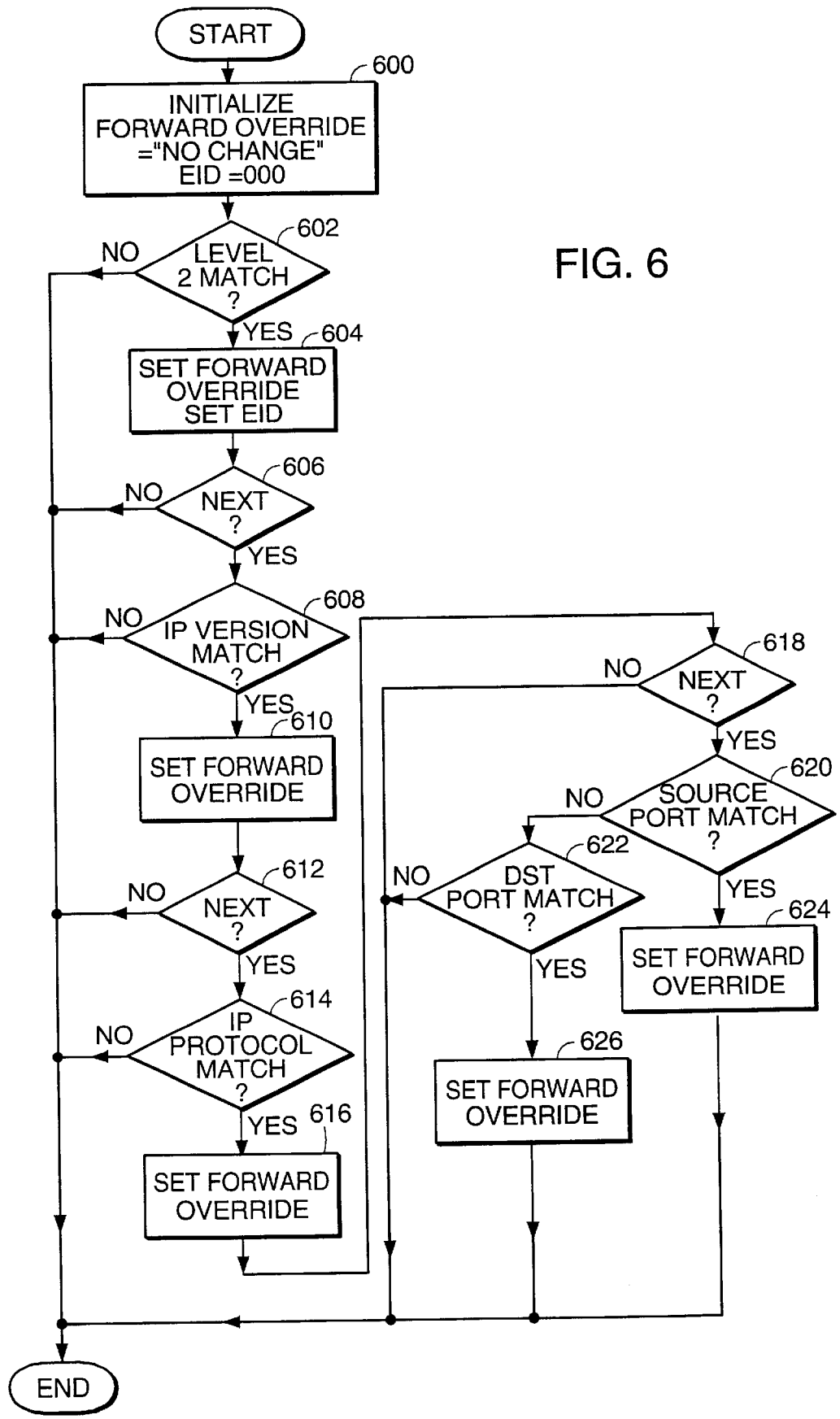
FIG. 6 is a flowchart of the steps performed in the forward override logic shown in FIG. 2 for selecting a forward override for the received data packet.

FIG. 6 is a flowchart of the steps performed in the forward override logic 200 (FIG. 2) to select a forward override 206 (FIG. 2) for the received data packet dependent on the network protocol encoded in the received data packet's headers. FIG. 6 is described in conjunction with FIGS. 2, 4A–4E and 5A–5E.

At step 600, the forward override logic 200 (FIG. 2) receives a data packet header from an ingress port 102 (FIG. 1). The forward override logic 200 (FIG. 2) initializes the forward override 206 (FIG. 2) and initializes an EID register (not shown) in the forward override logic 200. Processing continues with step 602.

At step 602, the forward override logic 200 (FIG. 2) forwards an EID search key 208b (FIG. 4B) to the protocol CAM 202 (FIG. 1). The MSB of the EID search key 208b (FIG. 4B) is set to "1" and includes the L2 payload type 414

(FIG. 4B) from the length/type field 520 (FIG. 5B) in the Ethernet data link (L2) header 504 (FIG. 5B) included in the received data packet. If there is a matching EID entry 300b (FIG. 4B) processing continues with step 604. If not, processing of the received data packet is complete and the forward override 206 (FIG. 2) is set to a default value stored in the Unknown_EID_Default_Override register(not shown) in the forward override logic 202 (FIG. 2). The default value for the forward override may be selected by the host processor to forward the data packet to segment buffer memory 108 (FIG. 1).

At step 604, forward override 206 (FIG. 2) is set to the L2 forward override value stored in the forward override field 408b (FIG. 4B) in the EID associated data 210b (FIG. 4B). Processing continues with step 606.

At step 606, the forward override logic 200 (FIG. 2) examines the next field 402b (FIG. 4B) in the EID entry 300b (FIG. 4B). If the next field 402b (FIG. 4B) indicates that a further search of the protocol CAM 202 (FIG. 2) is required, processing continues with step 608. If not, processing of the received data packet is complete.

At step 608, the forward override logic 200 (FIG. 2) forwards an IP version search key 208d (FIG. 4D) to the protocol CAM 202 (FIG. 2). The IP version search key's MSBs 416 are set to "001" and the IP version search key 208d (FIG. 4D) includes the IP version 432 (FIG. 4D) extracted from the IP version field 522 (FIG. 5C) in the IP networking layer (L3) header 506 (FIG. 5C) of the ingress data packet (FIG. 5A). If a match is found in the protocol CAM 202 (FIG. 2), the IP version associated data 210d is forwarded to the forward override logic 200 and processing continues with step 610. If not, processing of the received data packet is complete.

At step 610, the forward override logic 200 (FIG. 2) sets forward override 206 (FIG. 2) to the forward override value 408d (FIG. 4D) stored in the IP version associated data 210d (FIG. 4D) in the IP version type entry 300d (FIG. 4D). Processing continues with step 612.

At step 612, the forward override logic 200 (FIG. 2) examines the next field 402c (FIG. 4C) in the IP version entry 300c. If the next field 402d (FIG. 4D) indicates that a further search of the protocol CAM 202 (FIG. 2) is required processing continues with step 614. If not, processing of the received data packet is complete.

At step 614, the forward override logic 200 (FIG. 2) forwards an IP Type search key 208c (FIG. 4C), to the protocol CAM 202 (FIG. 2). MSBs 426 (FIG. 4C) of the EP type search key 208c (FIG. 4C) are set to "001" and the IP type search key 208c includes the IPv4 type 428 (FIG. 4C) extracted from the protocol type field 540 (FIG. 5C) in the networking layer (L3) header 506 (FIG. 5C) of the ingress data packet (FIG. 5A). If a match is found for the EP type search key 208c in the protocol CAM 202 (FIG. 2), the EP type associated data 210c (FIG. 4C) is forwarded to the forward override logic 200 (FIG. 2) and processing continues with step 616. If not, processing of the received data packet is complete.

At step 616, the forward override logic 200 (FIG. 2) sets forward override 206 (FIG. 2) to the forward override value 408c stored in the IP type entry 300c. Processing continues with step 618.

At step 618, the forward override logic 200 (FIG. 2) examines the next field 402c (FIG. 4C) in the IP type entry 300c. If the next field 402c (FIG. 4C) indicates that a further search of the protocol CAM 202 (FIG. 2) is required processing continues with step 620. If not, processing of the received data packet is complete.

At step 620, the forward override logic 200 (FIG. 2) forwards an L4 port search key 208e (FIG. 4E) including MSBs 430 (FIG. 4E) set to "01" and L4 source port number extracted from the source port field 552 (FIGS. 5D–5E) in the L4 header 508 (FIGS. 5D, 5E) to the protocol CAM 202 (FIG. 2). If a source port match is found in the protocol CAM 202 (FIG. 2), a copy of the L4 port associated data 210e (FIG. 4E) is forwarded to the forward override logic 200 (FIG. 2) and processing continues with step 624. If not, processing continues with step 622.

At step 624, the forward override logic 200 (FIG. 2) sets forward override 206 (FIG. 2) to the forward override value 408e (FIG. 4E) stored in the L4 port associated data 210e (FIG. 4E) in the L4 port entry 300e (FIG. 4E). Processing of the received data packet is then complete.

At step 622, the forward override logic 200 (FIG. 2) forwards an L4 port search key 208e (FIG. 4E) including MSBs 430 (FIG. 4E) set to "01" and L4 destination port number from the destination port 554 (FIGS. 5D, 5E) stored in the L4 header 508 (FIGS. 5D, 5E) of the ingress data packet (FIG. 5A) to the protocol CAM 202 (FIG. 2). If a destination port match is found in the protocol CAM 202 (FIG. 2), a copy of the L4 port associated data 210e (FIG. 4E) is forwarded to the forward override logic 200 (FIGS. 2) and processing continues with step 626.

At step 626, the forward override logic 200 (FIG. 2) sets forward override 206 (FIG. 2) to the forward override value 408e (FIG. 4E) stored in the L4 port associated data 200e (FIG. 4E) in the L4 port entry 300e (FIG. 4E). Processing of the received data packet is then complete.

Thus, as many as five successive searches may be performed using the contents of the received data packet's header by the forward override logic 200 (FIG. 2) in the protocol CAM 202 (FIG. 2) in order to select the forward override 206 dependent on the network protocol encoded in the received data packet's header.

Figure 7:
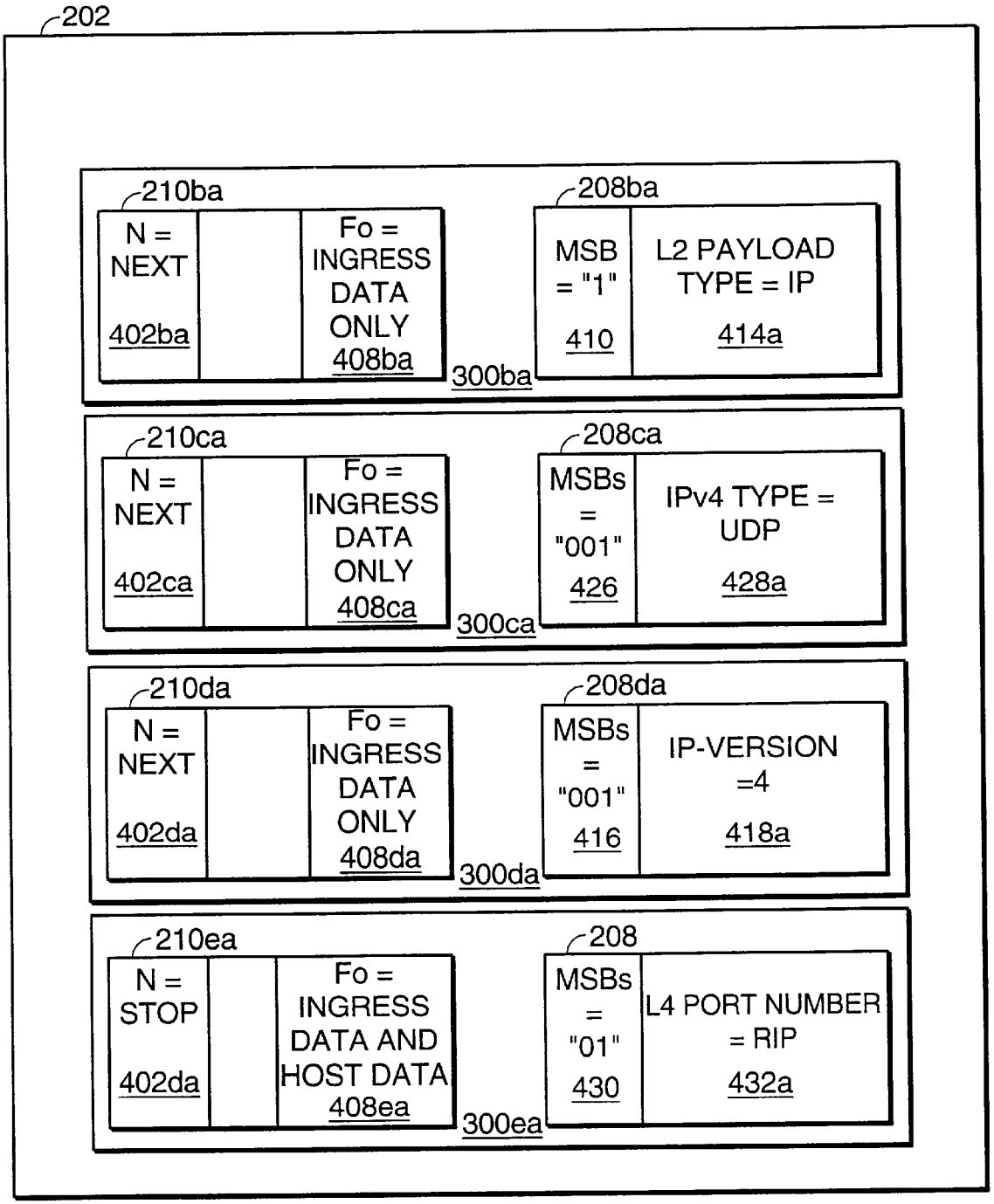
FIG. 7 illustrates entries in the protocol CAM.

FIG. 7 illustrates the four protocol CAM 300 entries searched in the protocol CAM 202 to select a forward override for a Routing Information Protocol ("RIP") data packet 206 (FIG. 2). The entries include an EID entry 300ba, an IPv4 Type entry 300ca an IP version entry 300da and an L4 port entry 300ea. The searching of the protocol CAM 202 (FIG. 2) to select a forward override for a RIP data packet are described in conjunction with FIG. 6.

At step 602 (FIG. 6) a search is performed using the contents of the Ethernet data link (L2) header 504 (FIG. 5B) included in the RIP data packet. A search key 208ba with MSB set to "1" and L2 payload type 414 set to IP; that is, the contents of the length/type field 520 (FIG. 5B) in the Ethernet data link (L2) header 504 (FIG. 5B) included in the RIP data packet, is forwarded to the protocol CAM from the forward override logic 200 (FIG. 2). The matching forwarding entry 300ba in the protocol CAM 202 includes the associated data 210ba. The associated data 210ba includes a next field 402ba set to "NEXT" and a forward override field 408ba set to "Ingress data only".

At step 606 (FIG. 6), another search of the protocol CAM 202 (FIG. 2) is performed because the next field 402ba is set to "NEXT". The search is performed using the contents of the IP network layer (L3) header 506 (FIG. 5C) included in the RIP data packet. A search key 208da with MSB set to "001" and IP version 418a set to the contents of the IP version field 522 in the IP network layer (L3) header 506 (FIG. 5C) included in the RIP data packet is forwarded to the protocol CAM 202 (FIG. 2) from the forward override logic 200 (FIG. 2). The matching forwarding entry 300da in the protocol CAM 202 includes the IP version associated data 210*da*. The IP version associated data 210*da* includes a next field 402*da* set to "NEXT" and a forward override field 408*da* set to "ingress data only".

At step 612 (FIG. 6) another search of the protocol CAM 202 (FIG. 2) is performed because the next field 402*da* is set to "NEXT". The search is performed using the contents of the IP network layer (L3) header 506 (FIG. 5C) included in the RIP data packet. An IP type search key 208*ca* with MSBs set to "001" and IP type 428 (FIG. 4C) set to UDP; that is, the contents of the IP Protocol Type field 540 (FIG. 5C) in the IP network layer (L3) header 506 (FIG. 5C) included in the RIP data packet, is forwarded to the protocol CAM 202 from the forward override logic 200 (FIG. 2). The matching forwarding entry 300*ca* in the protocol CAM 202 includes the associated data 210*ca*. The associated data 210*ca* includes a next field 402*da* set to "NEXT" and a forward override field 408*ca* set to "ingress data only".

At step 618 (FIG. 6) another search of the protocol CAM 202 is performed because the next field 402*da* is set to "NEXT". The search is performed using the contents of the UDP transport layer (L4) header 508*b* (FIG. 5E) included in the received RIP data packet. A search key 208*ea* with MSBs set to "001" and L4 port number set to the contents of the UDP source port field 552*b* (FIG. 5E) in the UDP transport layer (L4) header 508*b* (FIG. 5E), is forwarded to the protocol CAM 202 (FIG. 2) from the forward override logic 200 (FIG. 2). The matching forwarding entry 300*ea* in the protocol CAM 202 (FIG. 2) includes the L4 port associated data 210*ea*. The L4 port associated data 210*ea* includes a next field 402*ea* set to "STOP" and forward override field 408*ea* set to "ingress data and host data". The forward override 206 (FIG. 2) is set according to the contents of the forward override 408*ea*. The RIP data packet is forwarded to both the host interface logic 106 (FIG. 1) and the segment buffer memory 108 (FIG. 1).

The search of the protocol CAM 202 (FIG. 2) is complete because the next field 408*ea* is set to "STOP". Thus, four searches of the protocol CAM 202 (FIG. 2) are performed to select the forward override 206 (FIG. 2) for the RIP data packet.

As shown in FIGS. 4B–4E a Quality of Service (QoS) field 422, 424 may also be stored in the associated data 210 in the protocol CAM 202 (FIG. 2). The QoS field 306 (FIG. 3) may be used to assign a priority to the received data packet. The assigned priority is used by the egress ports engine 110 (FIG. 1) to select the order of packets to be forwarded on an egress port 112 (FIG. 1). For example, the contents of the QoS field 306 (FIG. 3) may be used to assign different priorities such as, to assign highest priority to a Telnet data packet and lowest priority to a HyperText Markup language ("HTTP") data packet. The switch 100 may include a separate port queues for each QoS value, with a pointer to the location in memory of the data packet stored in one or more of the port queues dependent on the contents of the QoS field 306 (FIG. 3) in the forwarding entry 300 (FIG. 3) for: the data packet type.

The invention has been described for a Local Area Network ("LAN"), but it is not limited to LANs it may also be implemented to select a forward override for data packets in a Wide Area Network.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch comprising:
   a memory comprising at least one forwarding entry, the forwarding entry including a forward override entry and a next field; and
   forward override logic which, for a data packet received by the switch, successively searches the memory for forwarding entries matching portions of the received data packet, extracts the forward override from a matching forwarding entry and determines whether to perform another search of the memory dependent on the state of the next field in a current forwarding entry.

2. The switch as claimed in claim 1 wherein the memory is a content addressable memory.

3. The switch as claimed in claim 1 further comprising:
   forward select logic which forwards the received data packet dependent on the extracted forward override corresponding to a final search.

4. The switch as claimed in claim 1 wherein the forwarding entry further comprises a priority field, the priority field including an assigned priority for the received data packet.

5. The switch as claimed in claim 1 wherein the forwarding entry further comprises a host traffic label field, the host traffic label field including classification data for the received data packet.

6. The switch as claimed in claim 1 wherein the portions of the received data packets identify protocols.

7. A method for selecting a forward override for a received data packet in a switch comprising the steps of:
   providing a memory, the memory comprising at least one forwarding entry, the forwarding entry including a forward override;
   successively searching the memory for forwarding entries matching portions of a received data packet;
   determining whether to perform another search of the memory dependent on the state of a next field in a current forwarding entry; and
   extracting the forward override from a matching protocol entry.

8. The method as claimed in claim 7 wherein the memory is content addressable memory.

9. The method as claimed in claim 8 wherein the content addressable memory comprises registers.

10. The method as claimed in claim 7 further comprising the step of:
    forwarding the received data packet dependent on the extracted forward override corresponding to a final search.

11. The method as claimed in claim 7 wherein the forwarding entry further comprises a priority field, the priority field including an assigned priority for the received data packet.

12. The method as claimed in claim 7 wherein the forwarding entry further comprises a host traffic label field, the host traffic label field including classification data for the received data packet.

13. The method as claimed in claim 7 wherein the portions of the received data packets identify protocols.

14. A switch comprising:
    a memory comprising at least one forwarding entry, the forwarding entry including a forward override;
    means for successively searching the memory for forwarding entries matching portions of a received data packet;
    means for determining whether to perform another search of the memory dependent on the state of a next field included in the forwarding entry; and means for extracting the forward override from a matching forwarding entry.

15. The switch as claimed in claim 14 wherein the memory is a content addressable memory.

16. The switch as claimed in claim 14 further comprising:
   means for forwarding the received data packet dependent on the extracted forward override corresponding to a final search.

17. The switch as claimed in claim 14 wherein the forwarding entry further comprises a priority field the priority field including an assigned priority for the received data packet.

18. The switch as claimed in claim 14 wherein the forwarding entry further includes a host traffic label field, the host traffic label field including classification data for the received data packet.

19. The switch as claimed in claim 14 wherein the portions of the received data packets identify protocols.

20. A switch comprising:
   a protocol CAM comprising at least one forwarding entry, the forwarding entry including a forward override and a next field; and
   forward override logic which, for a received data packet, successively searches the protocol CAM for forwarding entries matching portions of the received data packet and extracts the forward override from a matching forwarding entry and determines whether to perform another search of the protocol CAM dependent on the state of the next field in a current forwarding entry.

21. The switch as claimed in claim 20 further comprising:
   forward select logic which forwards the received data packet dependent on the extracted forward override corresponding to a final search.

22. The switch as claimed in claim 20 wherein the forwarding entry further comprises a priority field, the priority field including an assigned priority for the received data packet.

23. The switch as claimed in claim 20 wherein the forwarding entry further comprises a host traffic label field, the host traffic label field including classification data for the received data packet.

24. A method for selecting a forward override for a received data packet in a switch comprising the steps of:
   providing a protocol CAM, the protocol CAM comprising at least one forwarding entry, the forwarding entry including a forward override;
   determining whether to perform another search of the protocol CAM dependent on the state of a next field in a current forwarding entry; and
   extracting the forward override from a matching protocol entry.

25. The method as claimed in claim 24 further comprising the step of:
   forwarding the received data packet dependent on the extracted forward override.

26. The method as claimed in claim 24 wherein the forwarding entry further comprises a priority field, the priority field including an assigned priority for the received data packet.

27. The method as claimed in claim 24 wherein the forwarding entry further comprises a host traffic label field, the host traffic label field including classification data for the received data packet.

28. A switch comprising:
   a protocol CAM comprising at least one forwarding entry, the forwarding entry including a forward override;
   means for successively searching the protocol CAM for forwarding entries matching portions of a received data packet;
   means for determining whether to perform another search of the protocol CAM dependent on the state of a next field included in a current forwarding entry; and
   means for extracting the forward override from a matching forwarding entry.

29. The switch as claimed in claim 28 further comprising:
   means for forwarding the received data packet dependent on the extracted forward override resulting from a final search.

30. The switch as claimed in claim 28 wherein the forwarding entry further comprises a priority field the priority field including an assigned priority for the received data packet.

31. The switch as claimed in claim 28 wherein the forwarding entry further includes a host traffic label field, the host traffic label field including classification data for the received data packet.

* * * * *